US012068147B2

(12) United States Patent
Scheier et al.

(10) Patent No.: US 12,068,147 B2
(45) Date of Patent: Aug. 20, 2024

(54) SIZE SELECTED CLUSTERS AND NANOPARTICLES

(71) Applicant: Universität Innsbruck, Innsbruck (AT)

(72) Inventors: Paul Scheier, Innsbruck (AT); Felix Laimer, Innsbruck (AT); Lorenz Kranabetter, Aarhus C (DK); Fabio Zappa, Innsbruck (AT); Michael Renzler, Innsbruck (AT); Lukas Thiefenthaler, Innsbruck (AT); Simon Albertini, Zurich (CH); Paul Martini, Stockholm (SE); Siegfried Kollotzek, Innsbruck (AT)

(73) Assignee: UNIVERSITÄT INNSBRUCK, Innsbruck (AT)

( * ) Notice: Subject to any disclaimer, the term of this patent is extended or adjusted under 35 U.S.C. 154(b) by 429 days.

(21) Appl. No.: 17/611,292

(22) PCT Filed: May 15, 2020

(86) PCT No.: PCT/EP2020/063592

§ 371 (c)(1),
(2) Date: Nov. 15, 2021

(87) PCT Pub. No.: WO2020/234145

PCT Pub. Date: Nov. 26, 2020

(65) Prior Publication Data

US 2022/0238319 A1 Jul. 28, 2022

(30) Foreign Application Priority Data

May 17, 2019 (EP) .................................... 19175108

(51) Int. Cl.
*H01J 49/14* (2006.01)
*H01J 49/00* (2006.01)
*H01J 49/42* (2006.01)

(52) U.S. Cl.
CPC ........ *H01J 49/147* (2013.01); *H01J 49/0054* (2013.01); *H01J 49/4215* (2013.01)

(58) Field of Classification Search
CPC ... H01J 49/147; H01J 49/0054; H01J 49/4215
See application file for complete search history.

(56) References Cited

U.S. PATENT DOCUMENTS 5,055,677 A * 10/1991 Amirav .................. H01J 49/00 250/288
6,207,951 B1 * 3/2001 Yamauchi ............. H05G 2/003 250/493.1

(Continued)

OTHER PUBLICATIONS

Anonymous: "Graduate Thesis Or Dissertation Properties of Large Superfluid Helium Droplets I ID: 6h441011 w I ScholarsArchive@OSU", May 1, 2019 (May 1, 2019), pp. 1-5, XP055838747.

(Continued)

*Primary Examiner* — Nicole M Ippolito
(74) *Attorney, Agent, or Firm* — Workman Nydegger

(57) ABSTRACT

Method for producing multiply-charged helium nanodroplets and charged dopant clusters and nanoparticles out of the helium nanodroplets, the method comprising: •producing neutral helium nanodroplets in a cold head (1) via expansion of a pressurized, pre-cooled, supersonic helium beam of high purity through a nozzle (3) into high vacuum with a base pressure under operation preferably below 20 mPa, •ionizing the helium nanodroplets by electron impact (15), wherein the electron impact (15) leads to multiply-charged helium nanodroplets, •doping the charged helium nanodroplets with dopant vapor in the pickup cell (19), wherein the doped nanodroplets form cluster ions with the initial charges acting as seeds, wherein the size of the nanoparticles can vary from a few atoms up to 105 atoms by arranging the size of the neutral helium nanodroplets, the charge of the helium (Continued)

nanodroplets and the density of dopant vapor in the pickup cell (19).

22 Claims, 3 Drawing Sheets

(56) References Cited

U.S. PATENT DOCUMENTS

| | | | | |
|---|---|---|---|---|
| 10,497,548 | B1 * | 12/2019 | Amirav | G01N 30/724 |
| 2005/0124332 | A1 | 6/2005 | Clark et al. | |
| 2008/0164409 | A1 * | 7/2008 | Schultz | G01N 27/623 250/288 |

OTHER PUBLICATIONS

International Search Report and Written Opinion received for PCT Patent Application No. PCT/EP2020/063592, mailed on Oct. 27, 2020, 10 pages (2 pages of English Translation and 8 pages of Original Document).

International Search Report issued in PCT/EP2020/063592 dated Aug. 17, 2020.

Maha Alghamdi: "PhD Disseration: Properties of Large Superfluid Helium Droplets", May 1, 2019.

Maha Alghamdi et al., "Doping of Green Fluorescent Protein into Superfluid Helium Droplets" Size and Velocity of Doped Droplets, Journal of Physical Chemistry. A, Molecules, Spectroscopy, Kinetics, Environment and General Theory, vol. 121, No. 36, Aug. 21, 2017.

Fiefenthaler L et al., "An intense source for cold cluster ions of a specific composition", Review of Scientific Instruments, AIP, Melville NY, US. vol. 91, No. 3, Mar. 16, 2020.

Mauracher A et al., "Cold Physics and Chemistry: Collisions, Ionization and Reactions inside Helium Nanodroplets Close to Zero K", arxiv.org, Cornell University Library, May 9, 2018.

Vadim Mozhayskiy et al., "Use of helium nanodroplets for assembly, transport, and surface deposition of large molecular and atomic clusters", Journal of Chemical Physics, American Institute of Physics, US, vol. 127, No. 9, Sep. 7, 2007.

* cited by examiner

SIZE SELECTED CLUSTERS AND NANOPARTICLES

This Application is a 371 of International Patent Application No. PCT/EP2020/063592, filed May 15, 2020, which claims the benefit of European Patent Application No. 19175108.0, filed May 17, 2019, which are incorporated by reference in their entirety.

The present invention relates to an apparatus for producing charged monodisperse clusters and nanoparticles, comprising a helium droplet source and an ion source followed by pickup cells. Furthermore, the invention relates to a method for producing multiply-charged helium nanodroplets and size selected charged dopant clusters out of the helium nanodroplets.

BACKGROUND OF THE INVENTION

The ability to produce isolated clusters of a variety of materials is a lively subject of research. Being intermediates between single atoms and bulk matter, clusters present several interesting features whose elucidation pushes the boundaries not only of theoretical and experimental methods.

Moreover, clusters present in numerous opportunities for applications. Surface modification by cluster impact can be obtained with such disparate strategies as either at very high or very low energies. In both cases precise choice of the cluster size can play a major role. Another area where size selected clusters are of major interest is in catalysis and energy storage.

Several techniques have been employed to try to produce well defined clusters and one could separate them in two different classes.

In Brust, M. et al., *Synthesis of Thiol-Derivatized Gold Nanoparticles in a 2-Phase Liquid-Liquid System*, Journal of the Chemical Society-Chemical Communications, 1994(7): p. 801-802, the "wet route" is disclosed, where clusters of metals or other substances are prepared in solution, generally as a precipitate. The disadvantage of those techniques is that the clusters are produced with some protective layer that has to be removed if one needs just the bare cluster to be studied or used in a particular application.

The second class of methods is denominated as "gas phase route". There, the materials that form the aggregates have to be vaporized in some fashion and then agglomerate in a carrier gas flow to be later separated. In the gas phase route, especially for metals, high energy methods are generally used, such as laser ablation, ion beam sputtering, arc plasma, thermal atom bombarding, magnetron sputtering and more recently pulsed magnetron.

In Mozhayskiy, V., et al., *Use of helium nanodroplets for assembly, transport, and surface deposition of large molecular and atomic clusters*. Journal of Chemical Physics, 2007. 127(9), it is shown that helium droplets are able to pick up vapors of various materials (metals, molecular vapors etc.) for a long time. Furthermore, they are a generally successful route to form clusters without the use of any other solvent. The low temperature inside the droplets and enormous cooling rate of superfluid helium provides an environment for obtaining interesting mixtures of various species. The timescale of dopant cluster formation is only a few μs, which again reduces the risk of contamination with impurities from the residual gas in contrast to other recently developed matrix assisted methods.

However, all methods described so far result in a wide size range of clusters or nanoparticles that can be fitted very well with a log-normal distribution. Only the co-expansion of neutral and charged argon, with the latter produced via a discharge at several 100 Pa, into vacuum resulted in a narrow size distribution as disclosed in Harris, I. A., R. S. Kidwell, and J. A. Northby, *Structure of Charged Argon Clusters Formed in a Free Jet Expansion*. Physical Review Letters, 1984. 53(25): p. 2390-2393. The ions in this experiment act as seeds for cluster growth and the expansion conditions determine the average size of the resulting cluster ions.

Short Description of the Invention

The object of the present invention is to provide a method and an apparatus for producing clusters or nanoparticles with a narrow size distribution.

The problem of producing size selected clusters and nanoparticles can be solved according to the invention with a method for producing multiply-charged helium nanodroplets charged dopant clusters and nanoparticles out of these helium nanodroplets. This method may comprise the following steps

- producing neutral helium nanodroplets with a cold head via expansion of a pressurized, pre-cooled, supersonic helium beam of preferably high purity through a nozzle into high vacuum with a base pressure under operation preferably below 20 mPa,
- ionizing the helium nanodroplets by electron impact, wherein the electron impact leads to multiply-charged droplets,
- doping the charged nanodroplets with vaporized dopants in the pickup cell, wherein the doped nanodroplets form cluster ions with the initial charges acting as seeds.

The size of the nanoparticles can vary from a few atoms (such as two or more) up to $10^5$ atoms by arranging the size of the neutral helium nanodroplets, the charge of the helium nanodroplets and the density of dopant vapor in the pickup cell The helium nanodroplets, depending on the droplet size, are able to carry more than $10^3$ charges. Helium purity for producing neutral helium nanodroplets with a cold head via expansion of a pressurized, pre-cooled, supersonic helium beam could be 6.0 or higher.

In another embodiment the method may further comprise the step of mass selecting the charged helium nanodroplets by an energy filter via mass-per-charge selection with an electrostatic field. This mass selection may be done after ionizing the helium nanodroplets.

Thus, the present invention discloses the pickup of dopants into charged helium nanodroplets, which combines the advantages of the superfluid nano-cryo reactors with nucleation seeds that attract dopants via ion induced dipole interaction. Furthermore, multiply-charged helium nanodroplets that may contain several 1000 charges can be obtained with the invention at hand. Coulomb repulsion between the charges and their high mobility in superfluid helium nanodroplets leads to minimum energy configurations of the ions at the surface of a helium nanodroplet, which can be considered as a Coulomb crystal. The regular arrangement of the charges leads to uniform growth of many charged clusters in one droplet. Depending on the pickup conditions and other parameters of the apparatus according to the invention, size selected cluster ions can be formed with unprecedented efficiency. Several embodiments of the above described method allow to obtain these size-selected clusters and nanoparticles.

In one embodiment the preferably up to 20 bar pressurized ultrapure helium enters the cold head through a gas line. Furthermore, the helium may be pre-cooled by contact with the first cooling stage of the cold head around preferably 35 and 50 K.

A certain embodiment discloses a method for producing helium nanodroplets containing up to $10^4$ helium atoms via a subcritical expansion. For this method the temperature in the second cooling stage of the cold head may be between 10 and 25 K. The helium nanodroplets are then formed after helium which is still in its gas phase passes through the nozzle.

The preferred embodiment discloses a method for producing helium nanodroplets containing up to several trillion helium atoms. For this method, the temperature in the second cooling stage of the cold head may be between 4.2 and 10 K. The helium nanodroplets are then formed after passing through the nozzle by fragmentation of the helium that liquefies due to the low temperatures near the nozzle.

In another embodiment, the electron impact is given by an electron beam, which ionizes the neutral helium nanodroplet beam by crossing it. The electron beam current may be between 1 μA and 2 mA and the electron energy may be adjusted from close to zero eV to up to 200 eV, with an energy spread of about ±0.5 eV. The electron beam current and the electron energy are the main parameters affecting the charge of the helium nanodroplets. Preferably the electron beam current is chosen around 1 mA and the electron energy is chosen around 100 eV.

In one embodiment where a quadrupole bender is used as an energy filter, a polarity reversal of the quadrupole may direct the charged helium nanodroplet beam in the direction of a secondary electron multiplier for ion current determination instead of in the direction of the pickup cell, where the charged nanodroplets are doped.

Depending on the application, the doped nanodroplets may be guided into an ion guide filled with helium gas after leaving the pickup cell. There excess helium is evaporated by collision induced dissociation. Preferably, the ion guide is a RF-hexapole ion guide. This collision induced dissociation of helium allows to obtain certain cluster sizes or even single cluster ions, which are liberated from the huge nanodroplets. Furthermore, not all of the excess helium may be evaporated in the ion guide.

Alternatively, charged dopant clusters or nanoparticles can be ejected from the host droplet upon electron bombardment that increases the charge state of the droplet. Coulomb repulsion will lead to the ejection of both charged helium clusters and dopant clusters or nanoparticles.

Moreover, if the doped nanodroplets are used to coat a surface with size-selected nanoparticles containing more than $10^4$ atoms, it is not necessary to evaporate the helium. Then, the large, size-selected nanoparticles may be deposed on a surface via soft-landing with the nanoparticles still inside the helium nanodroplets. The advantage of the soft-landing when coating surfaces with nanoparticles is that the helium is acting as a cushion when the doped nanodroplet impinges on the surface. Thus, structural modifications of the nanoparticles during the deposition are limited.

The object of the present invention is further solved by an apparatus for carrying out the above mentioned method, i.e. for producing multiply-charged helium nanodroplets and size selected charged dopant clusters and nanoparticles, comprising:

- a helium droplet source,
- an ion source,
- and pickup cells inventive ion source comprises

- a differentially pumped vacuum chamber comprising
  - an electron impact ion source,
  - preferably an energy filter and
  - focusing lenses.

In this embodiment the ion source is directly mounted to the helium droplet source.

Summarizing the above described method for producing the charged clusters and nanoparticles comprises the following schematic steps:

- a production of the neutral helium nanodroplets;
- an ionization of the helium nanodroplets by electron impact;
- preferably a mass-per-charge selection of the charged helium nanodroplets;
- a pickup of dopant vapor and the formation of cluster ions;

Each of these steps can be accomplished by a variety of means and in the following preferred embodiments of the present invention will be discussed, which allow the production of an intense and well-defined ion cluster beam after accomplishing all steps in preferred ways.

The helium droplet source, especially a continuous helium droplet source, may comprise:

- a cold head, preferably with an inline filter,
- a gas line
- a vacuum chamber with a pumping array,
- a nozzle and
- a skimmer.

In a preferred embodiment, the helium nanodroplet beam, produced after the nozzle, runs through the skimmer into the vacuum chamber of the ion source. The skimmer is thus located at the transition of the helium droplet source to the ion source. In the ion source, the neutral nanodroplet beam is ionized by running through an electron impact ion source. Afterwards, the trajectory of the now charged beam can be manipulated using electromagnetic fields. Thus, by running through an energy filter only nanodroplets within a preferred range of kinetic energies are directed towards the pickup cell with the help of focusing lenses, which are arranged along the trajectory of the nanodroplet beam directly behind the energy filter. After passing the pickup cell, the trajectory of the doped nanodroplet beam may go through the last chamber of the inventive apparatus, namely a collision cell including an ion guide and a gas inlet.

In a preferred embodiment the inventive apparatus includes a second electron impact ion source to increase the charge state of the doped helium droplets. Preferably, the apparatus comprises an electron gun, which allows for the electron bombardment.

In another embodiment of the invention, a vacuum tight shutter separates the helium droplet source and the ion source.

Furthermore, the cold head is preferably part of a closed cycle helium cryostat and comprises two cooling stages. In the first cooling stage, the helium entering the cold head through the gas line gets pre-cooled by contact. In the second cooling stage the helium nanodroplets are formed, after passing through the nozzle. In one embodiment, a tubular block is directly mounted to the second cooling stage, wherein the gas line runs through this tubular block, which is preferably made out of oxygen free copper.

Furthermore, the cold head comprises an inline filter, which can be for example an all-welded inline filter with a pore size of 0.5 μm. The inline filter is attached to the second cooling stage and allows to remove all impurities but $H_2$ and Ne that are present in the helium gas.

In a preferred embodiment, the helium gas expands through the nozzle into the vacuum chamber with the pumping array, wherein the chamber is pumped by a turbomolecular pump which is backed by a roughing pump, that is preferably oil free. The pumping array enables a base pressure under operation below 20 mPa in the vacuum chamber. Without helium, the residual gas pressure is $10^{-7}$ Pa or less.

Moreover, the diameter of the nozzle is preferably around 5 μm, wherein the nozzle is made up of preferably 90 to 98 wt % platinum and the rest iridium. It may be attached to a nozzle block.

Before the helium gas expands through the nozzle, the temperature of the gas is measured with a silicon diode that is closely attached to the nozzle on the nozzle block. The silicon diode may then be used as an input for a PID controller, which controls a heating resistor in the helium droplet source. The heating resistor and the silicon diode may be attached to the nozzle block. The heater allows to control the temperature of the second cooling stage of the cold head between 4.2 and 25 K preferably with ±0.1 K precision.

The skimmer according to the invention at the transition of the helium droplet source to the ion source preferably has an orifice diameter in the range of 0.3 to 0.8 mm. In a preferred embodiment, the skimmer is positioned around 5 mm from the nozzle. In this disclosed embodiment the expanding plume, which passes through the skimmer, results in a supersonic jet with extremely narrow velocity distribution in the longitudinal direction and practically no velocity distribution in the transversal direction.

Embodiments may furthermore comprise a Viton ring, on which the cold head is placed. The cold head can preferably be shifted via two orthogonal pairs of adjusting screws. The entire cold head can be placed moveable on this Viton ring.

Furthermore, a heat shield may be attached to the first cooling stage of the cold head.

In another embodiment the differentially pumped vacuum chamber of the ion source is pumped by a turbomolecular pump, preferably a 700 l/s pump. This pump may be backed by a roughing pump, which can be oil-free. This pumping array allows to keep the vacuum chamber of the ion source at pressures around $10^{-4}$ Pa.

In certain embodiments, a secondary electron multiplier is located in the differentially pumped vacuum chamber of the ion source. This secondary electron multiplier may be arranged opposite of the pickup cell with the energy filter in between.

In another embodiment, additionally a conversion dynode may be placed in front of the secondary electron multiplier. This conversion dynode can be operated as a Faraday cup, which can measure the current of charged helium nanodroplets if the yield of charged droplets exceeds the range of the secondary electron multiplier.

The optional energy filter in the ion source may be electrostatic. It can be picked out of several possible geometries for example parallel plates, cylindrical or spherical sector fields and similar. In a preferred embodiment, the energy filter may be a quadrupole bender.

The ion source may not contain an energy filter, if the helium nanodroplets get intensively ionized by the electron impact source. Then, the charge density on the surface of all droplets will reach a constant maximum value that is determined by the surface tension of liquid helium. Furthermore, the pickup cross section also scales with the surface size and thus, every charge center will have the same efficient capture cross section for dopants.

In another disclosed embodiment of the apparatus, the pickup cell contains an oven and two heat shields. The oven may be arranged in the pickup cell, such that the nanodroplet beam runs through the middle of the oven. Moreover, the heat shields may be constructed such that they protect the pickup cell from heat. The oven may be ohmically heated and may reach up to 1500 K. With the oven also dopants that have a low vapor pressure like metals and other solids can be vaporized.

In certain embodiments, the oven comprises two concentric SHAPAL-M ceramic tubes aligned coaxially with the nanodroplet principal trajectory through the middle of the oven. The ceramic tubes may be 15 to 25 mm long and the inner tube has preferably a diameter of 8 to 12 mm. A tantalum wire of preferably 1 mm diameter may be wrapped in a helical shape around the inner tube, which may be hold in place by the outer tube.

Moreover, refractory materials like molybdenum or tungsten can be vaporized in the pickup cell via intense lasers.

Certain embodiments do not contain a high temperature oven in the pickup cell, as the used dopant may be a gas or a liquid. Then, the pickup cell just has to be slightly heated.

In another embodiment the chamber, which is entered by the doped nanodroplets after the pickup cell, contains an ion guide, which may be a RF-hexapole ion guide. Moreover, there may be another gas inlet in this chamber, which may allow ultra-clean helium to enter the ion guide. The ultra-clean helium may have a purity of 99.9999%. Additionally, the ultra-clean helium may be purified in a filter, which has preferably a pore size around 0.5 μm.

In another embodiment charged dopant clusters or nanoparticles are pushed out of the doped nanodroplet via formation of additional charge centers by additional electron bombardment. This method is preferentially utilized for large droplets and to prevent the introduction of impurities by a collision gas. The electron bombardment may be accomplished by a second electron impact ion source with an electron gun.

Depending on the controllable gas flow in the ion guide, the cluster ions may still contain a few helium atoms after leaving the ion guide. These cluster ions are also very interesting for scientific experiments, as they guarantee very low temperatures of the clusters.

A certain embodiment of the disclosed invention includes the addition of traces of other gases to the helium in the ion guide. This could be for example water vapor.

Embodiments of an apparatus for analyzing the produced cluster ions via mass spectrometers are also disclosed. One embodiment comprises for example a quadrupole-time-of-flight (Q-TOF) mass spectrometer, which is coupled to the exit of the ion guide. Preferably, the exit of a RF-hexapole ion guide is coupled to the entrance of an ion guide belonging to a commercial Q-TOF Ultima mass spectrometer. The mass spectrometer may be equipped with a quadrupole mass filter. Furthermore, there may be another differentially pumped collision cell close to the mass filter. The quadrupole mass filter may then select the ions to enter either the collision cell or a preferably orthogonal-extraction reflectron TOF mass spectrometer. Furthermore, with the help of the quadrupole mass filter the clusters can be size-selected.

DETAILED DESCRIPTION AND PREFERRED EMBODIMENTS

The foregoing and other objects, features, and advantages of the invention will become more apparent from the following detailed description, which proceeds with reference to the accompanying figures.

Figure 4A:
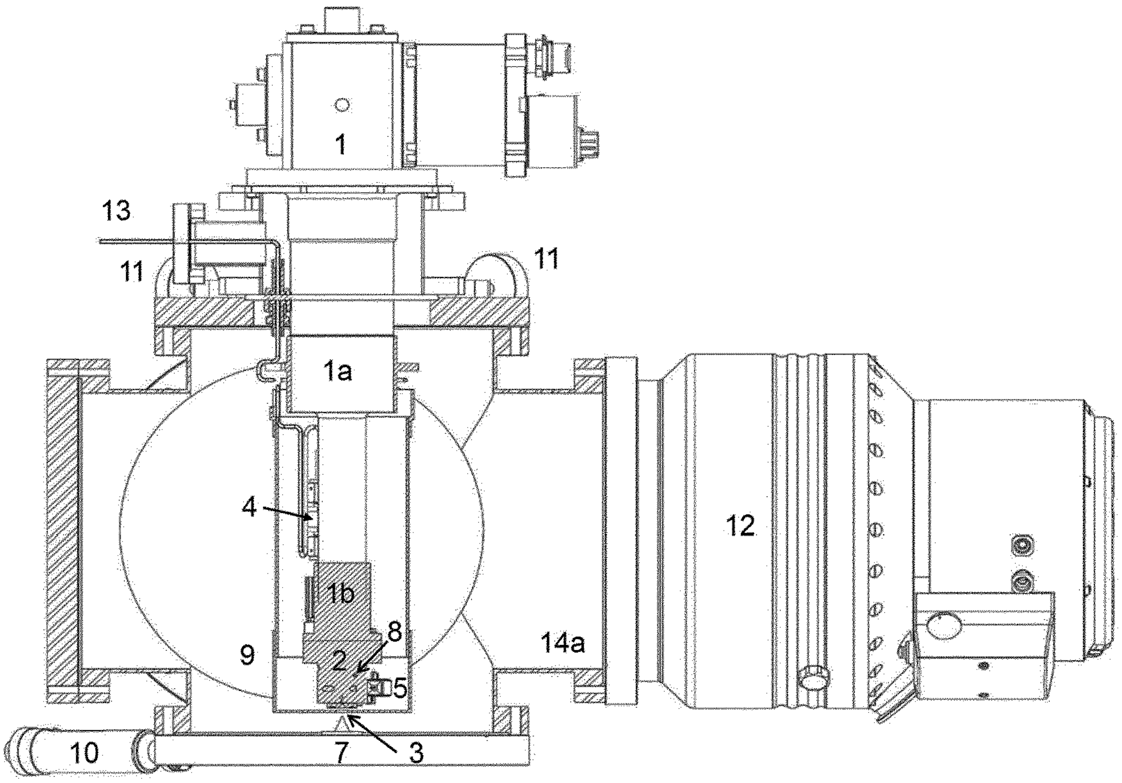
Figure 4B:
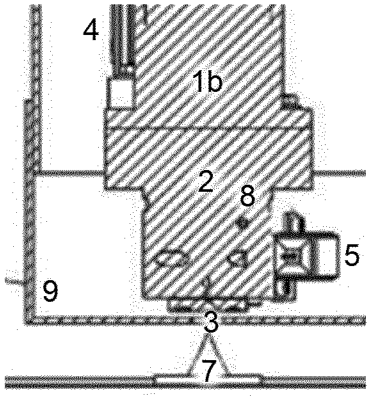

FIG. 4*a* shows a preferred embodiment of the helium droplet source with a detail depiction of the area around the nozzle block (FIG. 4*b*).

Figure 5:
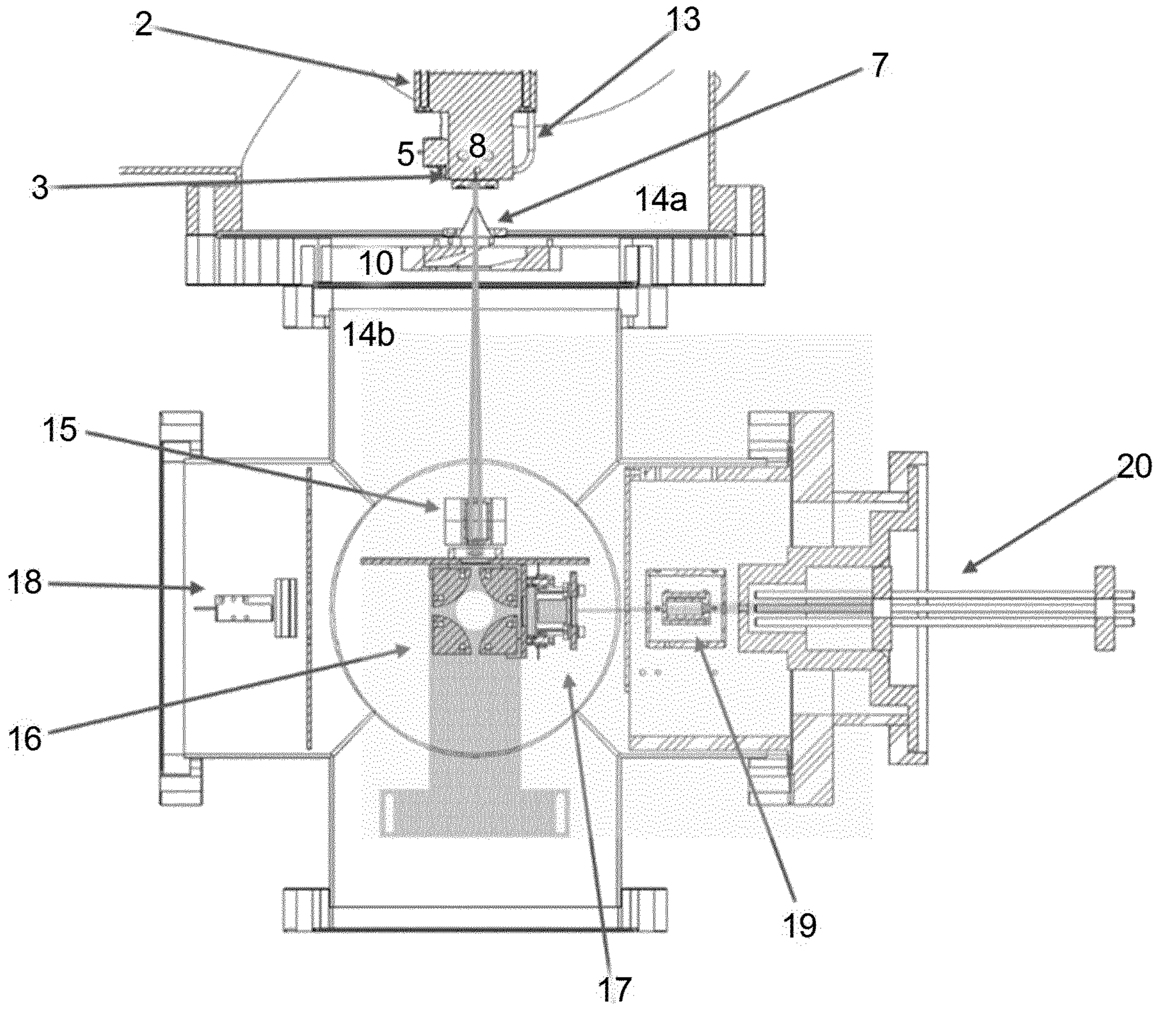

FIG. 5 provides a cross sectional view of the ion source including the transition of the helium droplet source to the entrance of the ion source, the pickup cell and collision cell at the outlet of the ion source.

FIG. 4*a* shows a helium droplet source, comprising a cold head 1 preferably with an inline filter 4, a vacuum chamber 14*a* with a pumping array 12, a nozzle block 2 with a heating resistor 5, a silicon diode 8 and a nozzle 3 attached, where the nozzle 3 faces a skimmer 7 at the bottom of the helium droplet source. The vacuum chamber 14*a* may be pumped by a turbomolecular pump at the pumping array 12 and can be separated from adjacent chambers by a vacuum tight shutter 10. The complete cold head can be moved horizontally with two orthogonal pairs of adjusting screws 11. An inline filter 4 is attached to the second cooling stage 1*b* (the 4 K stage) of the cold head to purify the pressurize helium introduced through the gas line 13. The heat shield 9 attached to the first stage of the cold head 1*a* reduces heating of the second cooling stage 1*b* via black body radiation from the vacuum chamber walls being at room temperature. The heating resistor 5 attached to the nozzle block 2 is used to set the temperature of the nozzle block 2 to a desired temperature between 4.2 K and 25 K, measured with a silicon diode 8. A PID regulator may then be used to control the heating resistor 5.

Furthermore, the cold head 1 is part of a closed cycle helium cryostat.

FIG. 5 shows an ion source, comprising a differentially pumped vacuum chamber 14*b* with an electron impact ion source 15, an energy filter 16 and focusing lenses 17. The ion source is directly mounted to the end of the helium droplet source below the skimmer 7.

Moreover, FIG. 5 depicts the pickup cell 19 and the collision cell with an ion guide 20 and a gas inlet.

The neutral nanodroplet beam runs from the skimmer 7 to the electron impact ion source 15, where it gets charged. Then, the charged helium nanodroplets enter the energy filter 16, where they get selected according to their mass per charge ratio. The selected nanodroplets are then directed by an array of focusing lenses 17 to the pickup cell 19, where they are doped. After leaving the pickup cell 19, the doped nanodroplet beam enters the collision cell realized by an RF ion guide 20.

Further, a secondary electron multiplier 18 may be located at the left-hand side of the differentially pumped vacuum chamber of the ion source as shown in FIG. 5. The secondary electron multiplier 18 is arranged opposite of the pickup cell 19 with the energy filter 16 in between. In front of the secondary electron multiplier 18 there can be a conversion dynode. The secondary electron multiplier 18 is mainly used to characterize the helium droplet source and to optimize the ion source and the neutral helium nanodroplet distribution.

In FIG. 5 the energy filter 16 is an electrostatic quadrupole bender.

The pickup cell 19 may contain an oven and two heat shields and the nanodroplet beam runs through the middle of the oven. For refractory materials, intense lasers can be used for the evaporation. If gases or liquids are used as dopants in the pickup cell, no oven is needed and the pickup cell is just heated up slightly.

Figure 1:
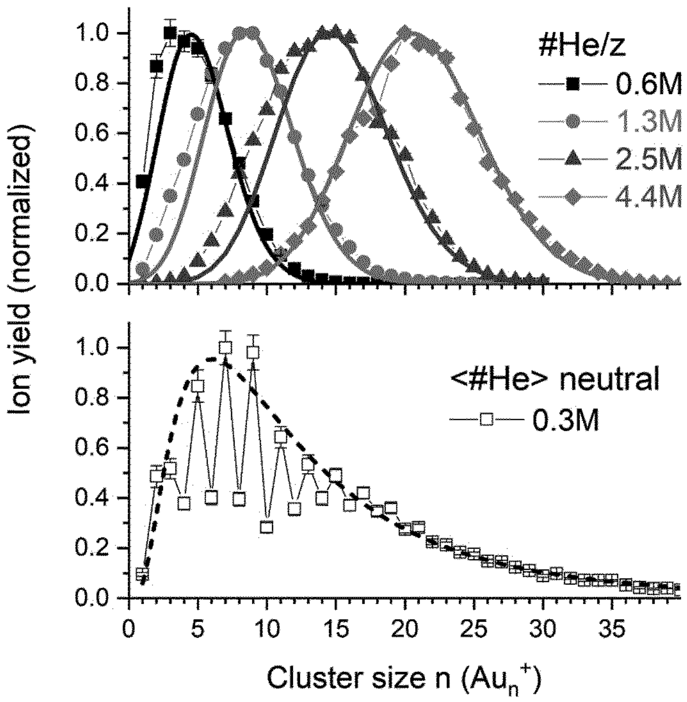
FIG. 1 shows the size distribution of cluster ions formed in multiply-charged helium droplets compared with the size distribution of cluster ions formed by neutral doped helium droplets.

In FIG. 1 the size distributions of cluster ions formed in charged helium nanodroplets are compared with those formed in neutral doped helium nanodroplets. Cluster ions formed in multiply charged helium droplets exhibit narrow size distributions, as shown in the upper diagram in FIG. 1 (solid symbols). In fact the size distributions perfectly match Poisson distributions (bold solid lines). In the example in FIG. 1 the nanodroplets are doped with gold atoms. The different distributions in the upper diagram correspond to different mass-per-charge ratios, which can be selected by the energy filter 16 in the ion source chamber 14*b*. The size of the dopant cluster ions in FIG. 1 can be tuned by the selected mass-per-charge value of the undoped multiply charged helium droplets.

The same dopant cluster ions formed upon electron ionization of neutral doped helium droplets are shown in the lower diagram in FIG. 1 (open symbols). These cluster ions exhibit a wide log-normal distribution with pronounced intensity anomalies that have been explained in the literature via differences in the stability of neighboring cluster sizes.

For the method according to the invention up to several thousand dopant cluster ions are formed in every droplet compared to only one cluster for the conventional method using neutral doped helium nanodroplets. Furthermore, cluster sizes that can hardly be made with conventional methods due to their reduced stability, such as cluster containing ten gold atoms in the example in FIG. 1, are formed upon pickup into multiply-charged helium droplets with a probability that only depends on the pickup cross section and the particle density of the dopant vapor. This results in a cluster size distribution that is free of any intensity anomalies and thus unstable cluster ions can be formed with large abundance.

Figure 2:
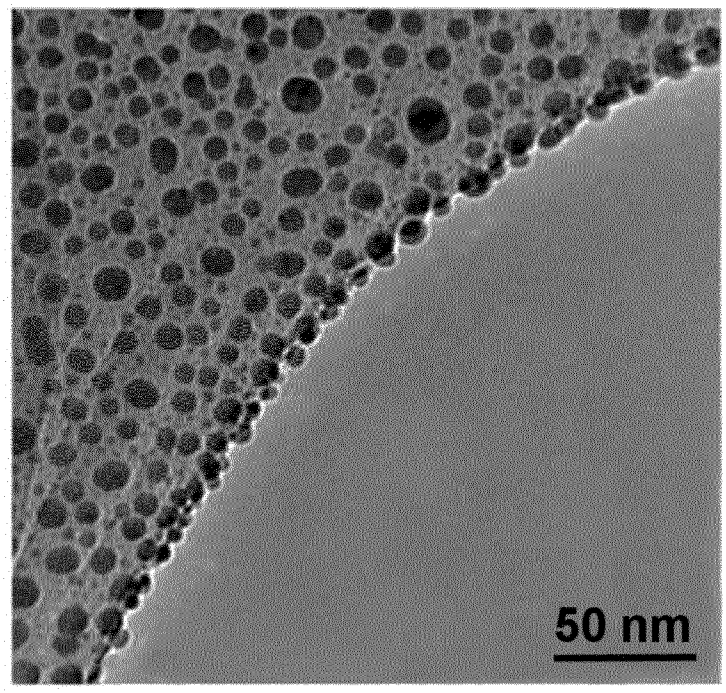
FIG. 2 shows a TEM image of silver/gold bi-metallic nanoparticles formed in neutral helium nanodroplets.
Figure 3:
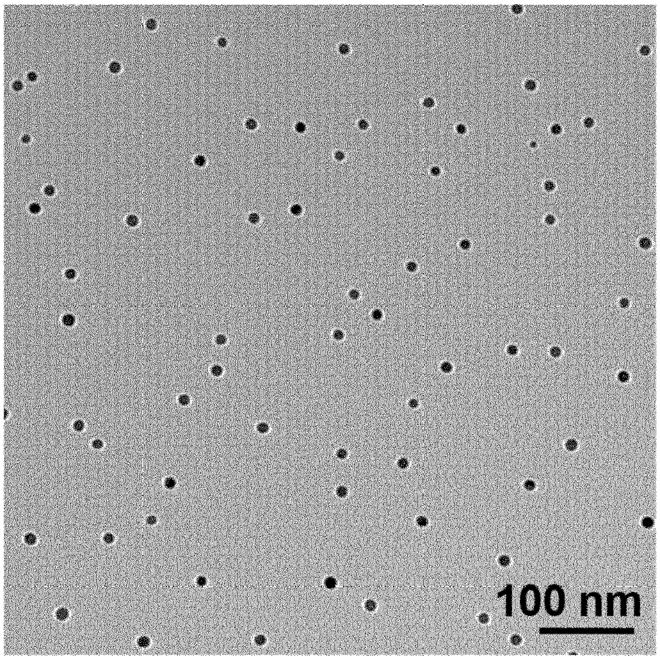
FIG. 3 shows a TEM image of gold nanoparticles formed in charged helium nanodroplets.

FIG. 2 and FIG. 3 disclose another advantage of the inventive method for producing charged size-selected nanoparticles.

FIG. 2 depicts a TEM image of silver/gold bi-metallic nanoparticles formed in neutral helium droplets, showing a broad distribution in particle size. FIG. 2 is adapted from Boatwright et al., Faraday Discuss. 162 (2013) 133. The image was taken under the following conditions of the apparatus: nozzle temperature 9.0K, helium pressure 2.0 MPa, average helium nanodroplet size $2\times10^6$.

FIG. 3 depicts a TEM image of gold nanoparticles formed in multiply-charged helium droplets, resulting in a narrow particle size distribution. The image was taken under the following conditions of the apparatus: nozzle temperature 4.5 K, helium pressure 2.5 MPa, mass-per-charge selected helium nanodroplet size $2\times10^7$.

By comparing FIG. 2 with FIG. 3 it can be easily seen that the size-selected nanoparticles produced via charged helium nanodroplets allow for a much smaller size distribution. Moreover, in the multiply-charged helium nanodroplets the clusters grow around each of the charge centers at the same time. With the apparatus according to the invention more than $10^6$ of the multiply-charged nanodroplets with a specific mass-to-charge ratio can be produced per second in the helium droplet source, where each of the charged nanodroplets contains more than $10^4$ clusters. Thus, surfaces of several $cm^2$ can be coated with size-selected nanoparticles in one second, with roughly $10^3$ nanoparticles per $\mu m^2$ (see also FIG. 3).

The production of helium droplets from pre-cooled supersonic beams is a well-established technique, but depends a lot on the special design. A preferred embodiment of the helium droplet source is shown in FIG. 4. There, high pressure (20 bar) helium gas of high purity (99.9999%) runs through a gas line 13 and is pre-cooled by contact with the first cooling stage 1*a* of a cold head 1. The cold head is part of a closed cycle helium cryostat. All impurities but $H_2$ and Ne that are in the helium gas are removed in an inline filter 4 also attached to the cold head 1. The inline filter 4 may have a pore size around 0.5 μm. Finally, the gas line 13 runs into a tubular block that is directly mounted to the second cooling stage 1*b*. On top of the tubular block, there is a nozzle 3. The block may be a cylindrical block, which is preferably made out of oxygen-free copper, to optimize the thermal heat transfer.

The ultra-pure helium gas expands continuously through a nozzle 3 into the vacuum chamber 14*a* evacuated with a pumping array 12. The nozzle 3 may be made up of 90 to 98 wt % platinum and the rest iridium. The diameter of the nozzle 3 may range from 2 to 10 μm. Preferably, the pumping array 12 consists of a turbomolecular pump, which is backed by roughing pump maintaining a base pressure under operation in the range of 5 to 20 mPa. The turbomolecular pump may be a Pfeiffer TPU 1600 with a pumping speed of 1450 l/s for helium and the roughing pump, which might also be oil free, is for example a Pfeiffer ACP 40. Without helium, the residual gas pressure is $10^{-7}$ Pa.

The temperature of the helium before expansion is measured with a silicon diode 8 attached closely to the nozzle 3 on the nozzle block 2 and used as an input for a PID regulator that controls a heater 5. The heater 5 allows to control the temperature of the second cooling stage 1*b* of the cold head between 4.2 and 25 K preferably with ±0.1 K precision. The silicon diode 8 could be for example a Lakeshore DT-670 with CU package. The PID regulator is for example a Lakeshore Temperature Controller Model 335 and the heating resistor 5 could be a Ohmite Resistor 825F25RE, 25Ω. As will become clear in the next paragraph, the control of the temperature in the second cooling stage 1*b* of the cold head 1, where the nanodroplets are formed, allows to control the size of the helium nanodroplets.

The expanding plume, where the helium droplets are formed, passes through a skimmer 7 positioned preferably about 5 mm from the nozzle 3. Preferably, the skimmer 7 has an orifice diameter of 0.5 mm. The skimmer 10 allows to protect the helium nanodroplet beam from the shock front, which emerges from the wall of the vacuum chamber. In order to optimize the throughput of helium nanodroplets the dimensions of the nozzle 3 and the skimmer 7 as well as their distance are of great importance. The inventive array of skimmer 7 and nozzle 3, depicted also in FIG. 4 and FIG. 5, results in a supersonic jet of neutral helium nanodroplets with extremely narrow velocity distribution in the longitudinal direction and practically no velocity in the transversal direction.

Furthermore, the droplet formation in the expanding plume is highly dependent on the temperature of the gas and stagnating pressure. For temperatures from 10 to 25 K, the formation may occur via subcritical expansion, where the helium is still gaseous when it passes the nozzle 3, leading to droplets containing up to $10^4$ helium atoms. For temperatures from 4.2 to 10 K, the droplets are formed via fragmentation of the helium that liquefies near the nozzle 3, resulting in sizes up to several trillion helium atoms. Thus, the low temperature regime allows to produce the large helium nanodroplets, which contain multiply charges after getting ionized in the electron impact source.

Thermal contraction of the cold head 1 when cooling from room temperature to a few Kelvin may lead to a lateral displacement of the nozzle 3 with respect to the opening of the skimmer 7. In order to compensate for this effect, the complete cold head 1 is placed moveable on a Viton ring and can be shifted with two orthogonal pairs of adjusting screws 11.

After passing the skimmer 7, the neutral helium nanodroplet beam enters the ion source chamber 14*b*. The ion source comprises a differentially pumped vacuum chamber 14*b*. This chamber may contain an electron impact ion source 15, an energy filter 16 to select or scan the charged droplets with respect to their mass-per-charge ratio (m/z), a channel electron multiplier detector 18 to measure the yield of the charged droplets and to determine droplet size (m/z) distributions. For intense ion yields, a conversion dynode in front of the secondary electron multiplier 18 can be operated as a Faraday cup. The conversion dynode helps to prevent a gas accumulation in the detector 18.

The ion source is kept preferably at pressures around $10^{-4}$ Pa by a 700 l/s turbomolecular pump backed with an oil-free roughing pump. The neutral nanodroplet beam may be crossed with an electron beam. This electron impact source 15 in the ion source chamber 14*b* is placed beneath the skimmer 7. Thus, a high production rate of ions is obtained, which requires a perfect overlap of electron beam and helium nanodroplet beam. The electron beam current used for the inventive apparatus preferably ranges between 1 μA to 2 mA and the electron energy can be adjusted for optimal ion signal from close to zero eV up to 200 eV, with an energy spread of about ±0.5 eV. The electron energies at about 2 eV and 22 eV are most suitable for obtaining negatively charged droplets.

The ionization cross sections of the helium droplets above ionization threshold are known to scale approximately as the geometrical cross section, which can be up to several thousand square nanometers. Therefore, large droplets can be ionized multiple times when sufficiently high electron currents are used.

Being charged species, the trajectories of the helium droplets can now be manipulated using electromagnetic fields. The fact that the droplets obtained from a supersonic beam exhibit a very narrow velocity spread, permits mass selection with electrostatic fields. Several geometries are possible, like parallel plates, cylindrical or spherical sector fields. A configuration that proved particularly useful is that of the quadrupole bender 16. With such a configuration as depicted in FIG. 5 a simple polarity reversal allows to direct the charged nanodroplet beam either in the direction of a standard secondary electron multiplier 18 and a Faraday cup for ion current determination, or in the direction of the pickup cell 19 where the droplets will be doped.

Opposite of the electron multiplier detector 18, there is the pickup cell 19 for dopant vapor. The quadrupole bender 16 directs the mass-per-charge selected helium droplet beam with the help of an array of focusing lenses 17 towards the pickup cell 19.

For dopants that have a low vapor pressure like for example gold, the fullerene $C_{60}$ or serine, an ohmically heated oven that can reach more than 1500 K is used for the inventive apparatus. This pick-up cell 19 consists of this oven and two heat shields, designed to protect the rest of the apparatus from the heat without sacrificing pumping speed. The oven is preferably made of two concentric SHAPAL-M ceramic tubes of 20 mm in length, aligned coaxially with the nanodroplet principal trajectory. The ceramic tubes have a high thermal conductivity. The inner tube has preferably an inner diameter of 10 mm, where a small amount of sample can be introduced. Around this tube, a tantalum wire of 1 mm diameter is wrapped in a helical shape. The outer ceramic tube holds the tantalum wire in place around the inner tube. Heat is obtained by applying current to the tantalum wire. The inventive oven allows to bring also hardly fusible materials like metals in the gas phase and can be reused. Moreover, the geometry of the oven allows on the one hand the helium droplet beam trajectory to go through the middle of the oven and on the other hand that no metal is condensed at the walls of the oven. When using gold as a dopant, enough vapor pressure is obtained at moderate heating power slightly above 100 W.

Each charged center in the helium nanodroplets acts as a seed for cluster growth. Thus, every large droplet is able to breed a huge number of dopant clusters simultaneously.

Furthermore, the collision of a dopant with the massive helium nanodroplet and its agglomeration to a charged dopant cluster releases energy into the surrounding helium matrix. For example, in the case of gold, the binding energy of each atom to a gold cluster is in the order of 2.6 eV to 4.7 eV. Taking the binding energy of a helium atom to a droplet as typically 0.6 meV, every addition of a gold atom is expected to result in the loss of 5000-8300 helium atoms. Since the initial number of atoms in a given droplet can be easily larger than $10^8$, its size is largely unaltered by the pickup events. When the desired application of the inventive apparatus is deposition of the aggregates on a surface, helium does not pose any problems and the device can be operated as is. However, when the aim of the apparatus according to the invention is to produce a beam of low-mass ions, it becomes important to shake off excess helium atoms.

For this purpose, the helium nanodroplet beam may enter the collision cell equipped with a gas inlet and an ion guide 20 after passing through the pickup cell 19. The ion guide 20 is preferably a RF-hexapole ion guide. In order to prevent exchange of adsorbed helium with other solvents, ultra-clean helium with preferably 99.9999% purity, which can be additionally purified in a filter, may be used. The gas flow can be controlled to maintain a differentially pumped, adjustable constant pressure, at room temperature. Evaporation of the droplets is expected due to their collisions with the gas and therefore as a function of the pressure. The RF-hexapole potential confines the ion beam in the axial direction as the droplets shrink and low-mass ions are liberated from it. The RF-hexapole 20 operates with a DC component on its axis that determines the potential energy of the clusters when evaporation of the helium droplet is completed. This DC potential energy therefore translates into the kinetic energy of the ions through the rest of the apparatus and it can be adjusted to obtain a beam of desired characteristics, such as surface deposition or mass analysis in a TOF mass spectrometer. Moreover, adding traces of another gas to the helium provides the possibility to solvate cluster ions with a small number of a given atom or molecule. In the case of biomolecular clusters, microsolvation with water is an important issue and often very difficult to achieve.

In order to determine the exact composition of low-mass cluster ions produced with the inventive apparatus, the exit of the guiding hexapole 20 is coupled to the entrance ion guide of a commercial Q-TOF Ultima mass spectrometer. This machine is equipped with a quadrupole mass filter that can be used to select the ions to enter yet another differentially pumped collision cell, as well as an orthogonal-extraction reflectron TOF mass spectrometer. All mass spectra presented in the following section were obtained utilizing this instrument.

EXAMPLES

In the following a few examples are discussed, where the size of the helium nanodroplets is relatively small, that is they contain below $10^7$ helium atoms. This is due to the fact that the TOF-mass spectrometer, which measures the ion signal in the end, can only operate at conditions that do not produce count rates of cluster ions exceeding 5000 cps, as otherwise the ion signal would be saturated.

Mass or size per charge distributions of charged droplet beams are measured by scanning the voltages applied to the rods of the quadrupole bender. The yield of charged droplets is measured with the secondary electron multiplier.

By measuring size per charge distributions for a wide range of source temperatures (4.4 K to 12 K) and electron ionization conditions (electron energy from 0 eV to 300 eV and electron current from 1 μA to 2 mA), information on the charged helium droplets before passing the pickup cells can be obtained when switching the polarity of the quadrupole bender.

A. Example 1

Gold Cluster Ions

Gold is vaporized in the oven in the pickup cell at temperatures around 1230 K. The first captured gold atoms will be attracted by the charged centers that are expected to be tightly bound $He_3^+$ cores, surrounded by a dense layer of helium atoms. Ion induced dipole interaction prevents helium atoms in this first layer to change their positions which is equivalent to a solid phase. Thus, such charged centers are often referred to as Atkins snowballs. The high potential energy of these charged centers efficiently leads to charge transfer to the first gold atom. Further neutral gold atoms will be attracted by a charged gold complex, which results in the growth of a gold cluster ion.

The average kinetic energy a gold atom transfers to the helium droplet via inelastic collisions is around 0.5 eV and the binding energy of one gold atom to a cluster is about 4.7 eV for clusters containing more than 30 atoms. This results in the evaporation of about 8000 helium atoms. For large droplets containing billions of helium atoms this mass loss is negligible, but for smaller droplets it will result in a substantial reduction of the capture cross section. Thereby, further pickup of gold becomes less likely and self-terminates the cluster growth.

The presence of more than one charge in a helium droplet leads to minimum energy configurations in the form of Coulomb crystals and the uniform separation of the charged centers leads to a uniform cluster growth, resulting in a narrow size distribution of the dopant clusters.

Except for really high gold pressure in the pickup cell, most gold cluster ions are still embedded in the large helium droplet. In an RF-hexapole filled with helium, this excess helium can be removed. Depending on the pressure and collision energy set, it is possible to liberate cluster ions with a few helium atoms still attached.

The total ion yield of pure gold cluster obtained with the apparatus according to the invention is more than two orders of magnitude higher than with a conventional apparatus where neutral droplets are doped with gold and ionized by electron impact and for helium tagged gold cluster ions, this factor increases up to 5000.

In the upper diagram of FIG. 1, size distributions of gold cluster ions are shown for four size per charge values selected by the quadrupole bender. The helium droplet source temperature was 8.5 K, the ion source was set to 62 eV and 200 μA and the helium pressure in the RF-hexapole was 0.18 Pa. The solid lines correspond to Poisson fits to the data. Except for the measurement with charged helium droplets consisting of 4.4 million atoms per charge (solid diamonds), the data points below the expectation value are clearly larger than the Poisson fit. This can be explained by collision induced fragmentation as the pressure of helium in the RF-hexapole is too high and after the evaporation of all helium the gold clusters ions are heated up. For comparison, the lower diagram shows a size distribution of cationic gold clusters measured upon electron ionization of neutral helium droplets, average size $3\times10^5$ helium atoms, doped with gold atoms. The dashed line represents a log-normal fit to the data, omitting the local minima up to a gold cluster size of n=12. Besides a more narrow size distribution for gold cluster ions grown in charged helium droplets, the data in the upper diagram are also lacking an odd-even oscillation and a shell closure at n=9. As every gold atom attaching to a charged cluster is able to release its binding energy into the helium matrix, one would not expect magic number clusters to exhibit enhanced intensity compared to their neighboring cluster sizes.

B. Example 2

Fullerene Cluster Ions

The same inventive oven as above can also be utilized to vaporize fullerenes that are then picked up by size-per-charge selected helium nanodroplets. The maximum yield of fullerene ions with helium attached by electron ionization of neutral helium nanodroplets doped with $C_{60}$ was below 1% of the yield of the bare ion.

With the apparatus according to the invention it is also possible to produce fullerene cluster ions with helium attached which provides for the first time a possibility for action spectroscopy of such ions.

Moreover, water or any other volatile molecule can be attached to ions embedded in large helium nanodroplets by adding trace amounts of these molecules to the helium used to liberate the ions from the large droplets in the collision cell.

The invention claimed is:

1. A method for producing multiply-charged helium nanodroplets and charged dopant clusters and nanoparticles out of the helium nanodroplets, the method comprising:

- producing neutral helium nanodroplets in a cold head via expansion of a pressurized, pre-cooled, supersonic helium beam of high purity through a nozzle into high vacuum,
- ionizing the helium nanodroplets by electron impact, wherein the electron impact leads to multiply-charged helium nanodroplets,
- doping the charged helium nanodroplets with dopant vapor in the pickup cell, wherein the doped nanodroplets form cluster ions with the initial charges acting as seeds,
- wherein the size of the nanoparticles can vary from a few atoms up to $10^5$ atoms by arranging the size of the neutral helium nanodroplets, the charge of the helium nanodroplets, and the density of dopant vapor in the pickup cell.

2. The method according to claim 1, characterized by a mass selection of the charged helium nanodroplets by an energy filter via mass-per-charge selection with an electrostatic field, wherein the charged nanodroplets are mass-selected before they get doped.

3. The method according to claim 2, wherein a polarity reversal of the quadrupole bender directs the charged helium nanodroplet beam in the direction of a secondary electron multiplier for ion current determination instead of in the direction of the pickup cell.

4. The method according to claim 2, wherein the energy filter is a quadrupole bender.

5. The method according to claim 1, wherein the pressurized high purity helium enters the cold head through a gas line, wherein the helium is pre-cooled by contact with the first cooling stage of the cold head (1) to a between about 35 and 50 K.

6. The method according to claim 1, characterized by a temperature of 4.2 to 10 K in a second cooling stage of the cold head, where the helium nanodroplets are formed after passing through the nozzle, wherein the formation occurs via fragmentation of the helium, leading to droplets containing up to several trillion helium atoms.

7. The method according to claim 1, characterized by an electron beam as the electron impact source, which ionizes the neutral helium nanodroplet beam by crossing it.

8. The method according to claim 7, wherein the electron beam current is between 1 μA and 2 mA, wherein the electron energy can be adjusted from close to zero eV to up to 200 eV.

9. The method according to claim 1, wherein excess helium is evaporated by collision induced dissociation in an ion guide filled with helium gas, wherein the charged clusters are liberated from the nanodroplets.

10. The method according to claim 9, wherein excess the ion guide is a RF-hexapole ion guide.

11. The method according to claim 1, wherein the large, size-selected nanoparticles containing more than $10^4$ atoms get deposed on a surface.

12. The method according to claim 11, wherein the large, size-selected nanoparticles containing more than $10^4$ atoms get deposed on the surface via soft-landing with the nanoparticles inside the helium nanodroplets.

13. The method according to claim 1, wherein the pressurized high purity helium has a base pressure under operation below 20 mPa.

14. An apparatus for producing multiply-charged helium nanodroplets and charged dopant clusters and nanoparticles, comprising:

- a helium droplet source,
- an ion source and
- a pickup cell,
- wherein the ion source comprises
  - a differentially pumped vacuum chamber comprising:
    - an electron impact ion source, and
    - focusing lenses,
- wherein the ion source is directly mounted to the helium droplet source.

15. The apparatus according to claim 14, wherein a vacuum tight shutter separates the helium droplet source and the ion source.

16. The apparatus according to claim 14, further comprising a collision cell with an ion guide and a gas inlet, wherein the ion guide is directly mounted to the outlet of the pickup cell.

17. The apparatus according to claim 14, further comprising a second electron impact source, wherein the second electron impact source is directly mounted to the outlet of the pickup cell.

18. The apparatus according to claim 14, further comprising a secondary electron multiplier in the differentially pumped vacuum chamber of the ion source, wherein the secondary electron multiplier is arranged opposite of the pickup cell preferably with the energy filter in between.

19. The apparatus according to claim 18, further comprising a conversion dynode placed in front of the secondary electron multiplier.

20. The apparatus according to claim 14, further comprising an oven and two heat shields in the pickup cell, wherein the nanodroplet beam runs through the middle of the oven, wherein the heat shields are constructed such that they protect the pickup cell from heat and wherein the oven is preferably ohmically heated and can reach preferably up to 1500 K.

21. The apparatus according to claim 14, wherein the helium droplet source comprises a cold head preferably with an inline filter, a vacuum chamber with a pumping array, a nozzle, a skimmer, and a gas line, wherein the skimmer is located at the transition of the helium droplet source to the ion source.

22. The apparatus according to claim 14, the differentially pumped vacuum chamber further comprising an energy filter.

* * * * *